United States Patent [19]
Eryurek

[11] Patent Number: 5,956,663
[45] Date of Patent: *Sep. 21, 1999

[54] SIGNAL PROCESSING TECHNIQUE WHICH SEPARATES SIGNAL COMPONENTS IN A SENSOR FOR SENSOR DIAGNOSTICS

[75] Inventor: Evren Eryurek, Minneapolis, Minn.

[73] Assignee: Rosemount, Inc., Eden Prairie, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/048,452

[22] Filed: Mar. 26, 1998

Related U.S. Application Data

[63] Continuation of application No. 08/744,980, Nov. 7, 1996, Pat. No. 5,828,567.

[51] Int. Cl.⁶ .................................................. G06F 19/00
[52] U.S. Cl. .......................... 702/183; 702/182; 364/184
[58] Field of Search ........................... 702/183, 189–190; 364/130, 184; 340/511–517, 870.16, 870.17; 327/518

[56] References Cited

U.S. PATENT DOCUMENTS

| | | | |
|---|---|---|---|
| Re. 29,383 | 9/1977 | Gallatin et al. | 137/14 |
| 3,096,434 | 7/1963 | King | 235/151 |
| 3,404,264 | 10/1968 | Kugler | 235/194 |
| 3,701,280 | 10/1972 | Stroman | 73/194 |
| 4,058,975 | 11/1977 | Gilbert et al. | 60/39.28 |
| 4,099,413 | 7/1978 | Ohte et al. | 73/359 |
| 4,337,516 | 6/1982 | Murphy et al. | 702/183 |
| 4,517,468 | 5/1985 | Kemper et al. | 290/52 |
| 4,530,234 | 7/1985 | Cullick et al. | 73/53 |
| 4,635,214 | 1/1987 | Kasai et al. | 702/183 |
| 4,642,782 | 2/1987 | Kemper et al. | 364/550 |
| 4,644,479 | 2/1987 | Kemper et al. | 364/550 |
| 4,649,515 | 3/1987 | Thompson et al. | 364/900 |
| 4,707,796 | 11/1987 | Calabro et al. | 364/552 |
| 4,777,585 | 10/1988 | Kokawa et al. | 364/164 |
| 4,831,564 | 5/1989 | Suga | 364/551.01 |

(List continued on next page.)

FOREIGN PATENT DOCUMENTS

| | | |
|---|---|---|
| 0 122 622 A1 | 10/1984 | European Pat. Off. . |
| 0 413 814 A1 | 2/1991 | European Pat. Off. . |
| 0 487 419 A2 | 5/1992 | European Pat. Off. . |
| 0 594 227 A1 | 4/1994 | European Pat. Off. . |
| 0 624 847 A1 | 11/1994 | European Pat. Off. . |
| 0 64 470 A2 | 3/1995 | European Pat. Off. . |
| 35 40 204 C1 | 9/1986 | Germany . |
| 40 08 560 A1 | 9/1990 | Germany . |
| 44 33 593 A1 | 6/1995 | Germany . |
| 195 02 499 A1 | 8/1996 | Germany . |
| 58-129316 | 8/1983 | Japan . |
| 59-116811 | 7/1984 | Japan . |
| 59-211196 | 11/1984 | Japan . |
| 59-211896 | 11/1984 | Japan . |
| 60-507 | 1/1985 | Japan . |
| 60-76619 | 5/1985 | Japan . |
| 60-131495 | 7/1985 | Japan . |

(List continued on next page.)

Primary Examiner—Kamini Shah
Assistant Examiner—Brian Bui
Attorney, Agent, or Firm—Westman, Champlin & Kelly, P.A.

[57] ABSTRACT

A device in the process control system includes a sensor input receiving a sensor signal. The sensor signal comprises a process variable signal and a residual sensor signal related to sensor operation. Diagnostic circuitry receives a separated sensor signal and responsively provides a diagnostic output related to the sensor. Sensor signal processing circuitry separates the sensor signal into signal components which are provided to the diagnostic circuitry.

28 Claims, 6 Drawing Sheets

U.S. PATENT DOCUMENTS

| | | | |
|---|---|---|---|
| 4,873,655 | 10/1989 | Kondraske | 364/553 |
| 4,907,167 | 3/1990 | Skeirik | 364/500 |
| 4,924,418 | 5/1990 | Bachman et al. | 364/550 |
| 4,934,196 | 6/1990 | Romano | 73/861.38 |
| 4,964,125 | 10/1990 | Kim | 371/15.1 |
| 4,992,965 | 2/1991 | Holter et al. | 364/551.01 |
| 5,005,142 | 4/1991 | Lipchak et al. | 364/550 |
| 5,043,862 | 8/1991 | Takahashi et al. | 364/162 |
| 5,053,815 | 10/1991 | Wendell | 355/208 |
| 5,081,598 | 1/1992 | Bellows et al. | 364/550 |
| 5,089,984 | 2/1992 | Struger et al. | 395/650 |
| 5,098,197 | 3/1992 | Shepard et al. | 374/120 |
| 5,099,436 | 3/1992 | McCown et al. | 364/550 |
| 5,103,409 | 4/1992 | Shimizu et al. | 364/556 |
| 5,111,531 | 5/1992 | Grayson et al. | 395/23 |
| 5,121,467 | 6/1992 | Skeirik | 395/11 |
| 5,122,976 | 6/1992 | Bellows et al. | 364/550 |
| 5,130,936 | 7/1992 | Sheppard et al. | 364/551.01 |
| 5,134,574 | 7/1992 | Beaverstock et al. | 364/551.01 |
| 5,142,612 | 8/1992 | Skeirik | 395/11 |
| 5,148,378 | 9/1992 | Shibayama et al. | 364/551.07 |
| 5,167,009 | 11/1992 | Skeirik | 395/27 |
| 5,175,678 | 12/1992 | Frerichs et al. | 364/148 |
| 5,193,143 | 3/1993 | Kaemmer et al. | 395/51 |
| 5,197,114 | 3/1993 | Skeirik | 395/22 |
| 5,197,328 | 3/1993 | Fitzgerald | 73/168 |
| 5,212,765 | 5/1993 | Skeirik | 395/11 |
| 5,214,582 | 5/1993 | Gray | 364/424.03 |
| 5,224,203 | 6/1993 | Skeirik | 395/22 |
| 5,228,780 | 7/1993 | Shepard et al. | 374/175 |
| 5,235,527 | 8/1993 | Ogawa et al. | 364/571.05 |
| 5,265,031 | 11/1993 | Malczewski | 364/497 |
| 5,265,222 | 11/1993 | Nishiya et al. | 395/3 |
| 5,274,572 | 12/1993 | O'Neill et al. | 364/550 |
| 5,282,131 | 1/1994 | Rudd et al. | 364/164 |
| 5,282,261 | 1/1994 | Skeirik | 395/22 |
| 5,293,585 | 3/1994 | Morita | 395/52 |
| 5,303,181 | 4/1994 | Stockton | 365/96 |
| 5,305,230 | 4/1994 | Matsumoto et al. | 364/495 |
| 5,311,421 | 5/1994 | Nomura et al. | 364/157 |
| 5,317,520 | 5/1994 | Castle | 364/482 |
| 5,327,357 | 7/1994 | Feinstein et al. | 364/502 |
| 5,333,240 | 7/1994 | Matsumoto et al. | 395/23 |
| 5,349,541 | 9/1994 | Alexandro, Jr. et al. | 364/578 |
| 5,357,449 | 10/1994 | Oh | 364/551.01 |
| 5,361,628 | 11/1994 | Marko et al. | 73/116 |
| 5,365,423 | 11/1994 | Chand | 364/140 |
| 5,367,612 | 11/1994 | Bozich et al. | 395/22 |
| 5,384,699 | 1/1995 | Levy et al. | 364/413.13 |
| 5,386,373 | 1/1995 | Keeler et al. | 364/577 |
| 5,394,341 | 2/1995 | Kepner | 364/551.01 |
| 5,394,543 | 2/1995 | Hill et al. | 395/575 |
| 5,404,064 | 4/1995 | Mermelstein et al. | 310/319 |
| 5,408,406 | 4/1995 | Mathur et al. | 364/163 |
| 5,408,586 | 4/1995 | Skeirik | 395/23 |
| 5,414,645 | 5/1995 | Hirano | 364/551.01 |
| 5,419,197 | 5/1995 | Ogi et al. | 73/659 |
| 5,430,642 | 7/1995 | Nakajima et al. | 364/148 |
| 5,440,478 | 8/1995 | Fisher et al. | 364/188 |
| 5,467,355 | 11/1995 | Umeda et al. | 364/571.04 |
| 5,469,735 | 11/1995 | Watanabe | 73/118.1 |
| 5,483,387 | 1/1996 | Bauhahn et al. | 359/885 |
| 5,485,753 | 1/1996 | Burns et al. | 73/720 |
| 5,486,996 | 1/1996 | Samad et al. | 364/152 |
| 5,488,697 | 1/1996 | Kaemmerer et al. | 395/51 |
| 5,489,831 | 2/1996 | Harris | 318/701 |
| 5,511,004 | 4/1996 | Dubost et al. | 364/551.01 |
| 5,548,528 | 8/1996 | Keeler et al. | 364/497 |
| 5,561,599 | 10/1996 | Lu | 364/164 |
| 5,570,300 | 10/1996 | Henry et al. | 364/551.01 |
| 5,572,420 | 11/1996 | Lu | 364/153 |
| 5,598,521 | 1/1997 | Kilgore et al. | 395/326 |
| 5,600,148 | 2/1997 | Cole et al. | 250/250 |
| 5,610,552 | 3/1997 | Schlesinger et al. | 327/560 |
| 5,640,491 | 6/1997 | Bhat et al. | 395/22 |
| 5,671,335 | 9/1997 | Davis et al. | 395/23 |
| 5,675,504 | 10/1997 | Serodes et al. | 364/496 |
| 5,700,090 | 12/1997 | Eryurek | 374/210 |
| 5,703,575 | 12/1997 | Kirkpatrick | 340/870.17 |
| 5,704,011 | 12/1997 | Hansen et al. | 395/22 |
| 5,705,978 | 1/1998 | Frick et al. | 340/511 |
| 5,746,511 | 5/1998 | Eryurek | 374/2 |
| 5,754,596 | 5/1998 | Bischoff et al. | 364/130 |
| 5,757,852 | 5/1998 | Jericevic et al. | 375/240 |
| 5,781,878 | 7/1998 | Mizoguchi et al. | 701/109 |
| 5,876,122 | 3/1999 | Eryurek | 324/541 |

FOREIGN PATENT DOCUMENTS

| | | |
|---|---|---|
| 62-30915 | 2/1987 | Japan. |
| 64-1914 | 1/1989 | Japan. |
| 64001914 | 1/1989 | Japan. |
| 64-72699 | 3/1989 | Japan. |
| 2-5105 | 1/1990 | Japan. |
| 5-122768 | 5/1993 | Japan. |
| 06242192 | 9/1994 | Japan. |
| 7-63586 | 3/1995 | Japan. |
| 07234988 | 9/1995 | Japan. |
| 8-54923 | 2/1996 | Japan. |
| 2 334 827 | 5/1996 | Japan. |
| 8-136386 | 5/1996 | Japan. |
| 8-166309 | 6/1996 | Japan. |
| 928704 | 6/1963 | United Kingdom. |
| WO 94/25933 | 11/1994 | WIPO. |
| WO 97/21157 | 6/1997 | WIPO. |

SIGNAL PROCESSING TECHNIQUE WHICH SEPARATES SIGNAL COMPONENTS IN A SENSOR FOR SENSOR DIAGNOSTICS

This application is a continuation of application Ser. No. 08/744,980, filed Nov. 7, 1996, now U.S. Pat. No. 5,828,567, issued Oct. 27, 1998.

BACKGROUND OF THE INVENTION

The present invention relates to process variable sensors of the type used in the process control industry. More specifically, the invention relates to life expectancy estimation and diagnostics for such a process variable sensor.

Process control transmitters are used to monitor process variables in industrial processes. For example, a transmitter might monitor pressure, temperature or flow (e.g., process variables) and transmit such process variables back to a control room, where a controller sends a control signal back to an actuator (e.g., valve, motor) to control the process. In order to monitor a process variable, the transmitter must include some type of a sensor. For example, transmitters include sensors with resistances or capacitances which vary in response to temperature, deformations or strain which allow the transmitter to measure, for example, temperature, pressure, flow, level, pH or turbidity.

As sensors age or are subjected to harsh environmental conditions, the accuracy of the sensor tends to degrade. Ultimately, the sensor will fail. Diagnostics can be performed on a sensor by monitoring the sensor output signal. For example, a simple diagnostic technique is to compare the sensor output to a maximum or minimum value and provide an alarm indication if the threshold is exceeded. However, one difficulty in prior art diagnostic techniques is that the variations in the process variable being sensed should not be incorrectly interpreted as a sensor fault.

SUMMARY OF THE INVENTION

A device in a process control system includes a sensor input which receives a composite sensor signal from a process variable sensor. The composite sensor signal includes a process variable signal related to the process variable being sensed and a residual sensor signal related to sensor operation. Wavelet preprocessing circuitry coupled to the sensor input separates components of the composite sensor signal and responsively provides the components of the sensor signal to diagnostic circuitry. Diagnostic circuitry receives and responsively provides an output related to sensor health.

DETAILED DESCRIPTION OF THE PREFERRED EMBODIMENTS

Figure 1:
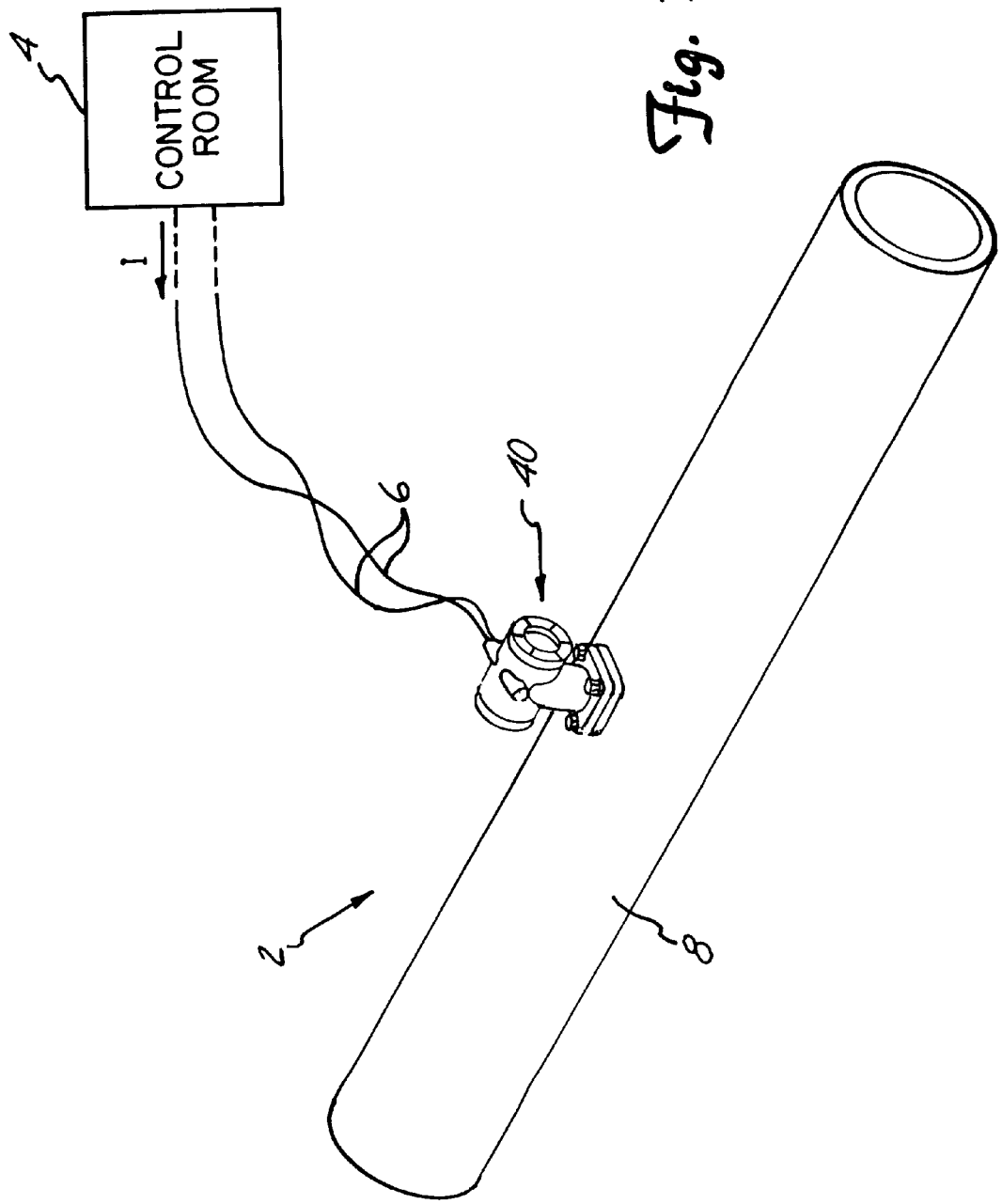
FIG. 1 shows a process control system including a transmitter in accordance with the present invention.

FIG. 1 is a diagram of process control system 2 including field mounted transmitter 40 coupled to control room 4 over a two wire process control loop 6. Transmitter 40 monitors a process variable (e.g., flow, pressure temperature) of process fluid in process piping 8. Transmitter 40 transmits information related to the sensed process variable to control room 4 over loop 6 by controlling the current flowing through loop 6. For example, the current flowing through loop 6 may be controlled between 4 and 20 mA and properly calibrated to indicate the process variable. Additionally or in the alternative, transmitter 40 may transmit digital information related to the sensed process variable over loop 6 to control room 4 such as in a HART® or Fieldbus protocol. Transmitter 40 includes circuitry described herein in more detail which provides advanced diagnostics including life expectancy information (e.g. health) related to sensor operation. The present invention may be implemented in, for example, a pressure transmitter, a magnetic flowmeter, a coriolis flowmeter, a level transmitter with a low power radar measuring means, a resistance based temperature transmitter, or any other type of transmitter.

Figure 2:
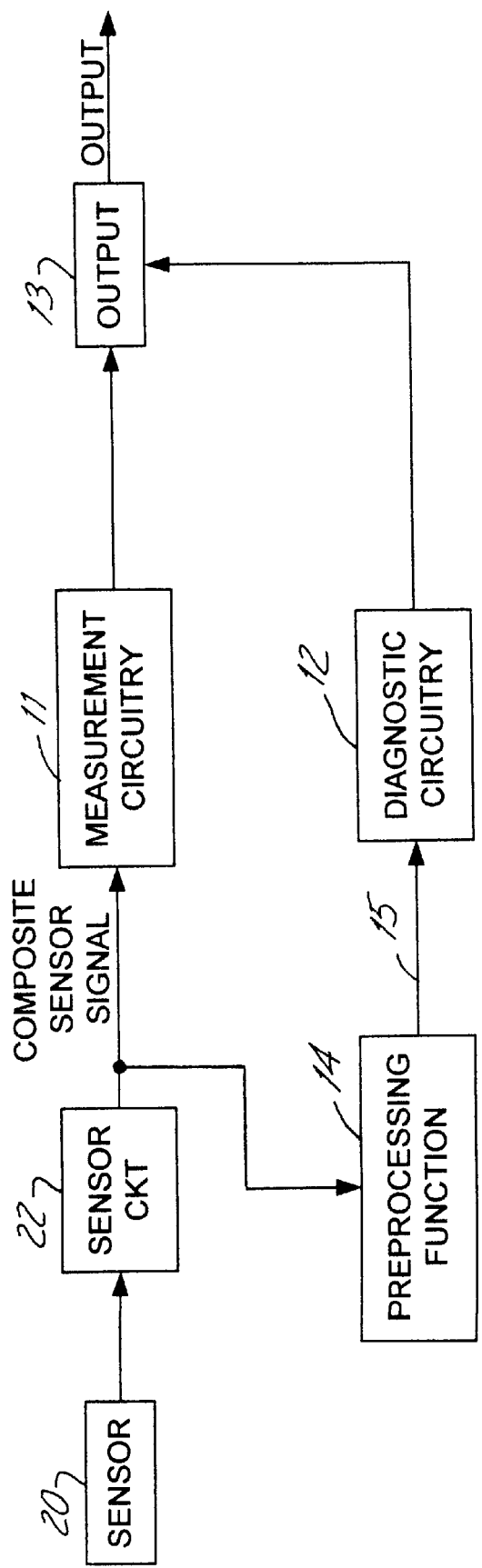
FIG. 2 is a simplified block diagram of diagnostic circuitry in accordance with the present invention.

FIG. 2 is a simplified block diagram of one example of circuitry for performing sensor diagnostics in accordance with the invention. As shown in FIG. 2, process variable sensor 20 and sensor compensation circuit 22 provide a composite sensor signal to measurement circuitry 11 and preprocessing function 14. Measurement circuitry 11 provides an output to output circuitry 13 representative of the process variable being measured. The composite sensor signal provided by sensor 20 includes a component related to the sensed process variable and a residual sensor signal due to mechanical or electrical characteristics (e.g., the transfer function, process noise, etc.) of sensor 20. Further, the signal related to the process variable may be separated into two components, one component due to repeatable sensor variations and another due to repeatable process variations.

Wavelet preprocessing function 14 receives the composite sensor signal and separates the individual signal components, including seasonal variations. These separate signals are provided to diagnostic circuitry 12 on data bus 15. As explained below, this allows diagnostic circuitry 12 to function on the separate, individual signals which make up the composite sensor signal, and, for example, provide a diagnostic output indicative of a failure of sensor 20.

Output circuitry 13 receives the process variable from measurement circuitry 11 and formats the output as desired. For example, the output may be coupled to loop 6 shown in FIG. 1. Further, output circuitry 13 receives the diagnostic signal from circuitry 12 which, for example, may be output on loop 6, used to inhibit the output of process variable or to alarm.

Figure 3:
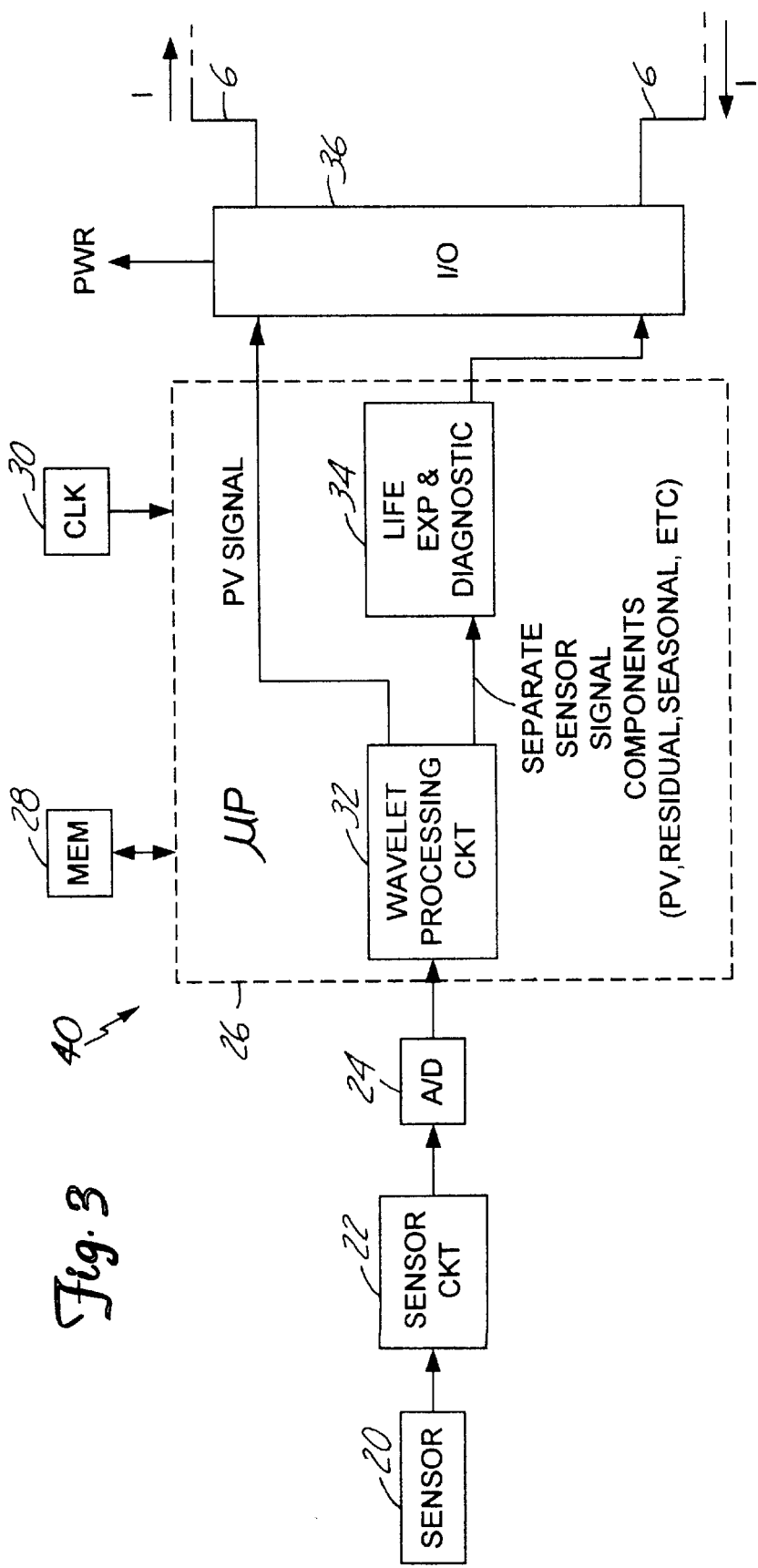
FIG. 3 is a simplified block diagram of a process device in accordance with the present invention.

FIG. 3 is a simplified block diagram of transmitter 40 in accordance with the present invention including wavelet preprocessing circuitry 32. Transmitter 40 includes sensor 20 which provides a sensor signal to sensor circuitry 22. Sensor 20 can be a resistance based sensor for sensing pressure or temperature (e.g., an RTD or a strain gauge), a capacitive pressure sensor, etc. As discussed, the sensor signal is a composite signal which includes a process variable signal and a residual sensor signal. Sensor circuitry 22 performs initial compensation including optional scaling, on the analog sensor signal and the output of sensor circuitry 22 is converted into a digital format by analog to digital converter 24. A microprocessor 26 receives the digitized process signal and is also coupled to memory 28 and a system clock 30. Microprocessor 26 operates in accordance with instructions stored in a memory 28 to perform various functions. Two such functions in accordance with the present invention are shown as blocks within microprocessor block 26. Specifically, microprocessor 26 includes substantially all of wavelet preprocessing circuitry 32 and sensor life expectancy and diagnostic circuitry 34. Outputs from microprocessor 26 are connected to input/output circuitry 36 and coupled to process control loop 6. I/O circuitry 36 also provides a regulated voltage output which, in some preferred embodiments, powers all of the circuitry of transmitter 40 received through process control loop 6.

Prior art diagnostic circuitry is often unable to separate the signal due to the process from the signal arising from the sensor and its transfer function. Thus, the prior art frequently cannot distinguish whether a recognized problem is caused by the sensor or the process. In contrast, the wavelet processing circuitry 32 of the present invention separates the composite sensor signal into its separate components. The separated sensor signals are provided to life expectancy and diagnostic circuitry 34 which is thereby able to more accurately determine life expectancy and diagnose sensor operation. Circuitry 34 receives a signal in which the "noise" from the process has been substantially eliminated. Circuits 32 and 34 may be realized in analog circuits, separate digital circuits, or through a microprocessor 26 as illustrated in FIG. 3.

Microprocessor 26 provides a signal related to the process variable and a life expectancy and diagnostics signal to I/O circuitry 36. I/O circuitry 36 transmits information over two wire loop 6 in accordance with known techniques as in a fully digital protocol such as Fieldbus or WorldFIP, a hybrid analog/digital protocol such as a 4–20 mA signal with a digital signal superimposed (e.g., HART®), or even according to the DE protocol. Further, microprocessor 26 may receive instructions sent from a hand-held communicator or control room 4 over loop 6.

The present invention can also be practiced in software resident in any of a number of places in a process control system such as in a field mounted controller, a remote PC or controller or even a final control element such as a valve, motor or switch. Furthermore, modern digital protocols such as Fieldbus, Profibus and others allow for the software which practices the present invention to be communicated between elements in a process control system, and also provide for process variables to be sensed in one transmitter and then sent to the software in a different piece of equipment.

Wavelet analysis is a technique for transforming a time domain signal into the frequency domain which, like a Fourier transformation, allows the frequency components to be identified. However, unlike a Fourier transformation, in a wavelet transformation the output includes information related to time. This may be expressed in the form of a three dimensional graph with time shown on one axis, frequency on a second axis and signal amplitude on a third axis. A discussion of wavelet analysis is given in *On-Line Tool Condition Monitoring System With Wavelet Fuzzy Neural Network,* by L. Xiaoli et al., 8 JOURNAL OF INTELLIGENT MANUFACTURING pgs. 271–276 (1997). In performing a continuous wavelet transformation a portion of the sensor signal is windowed and convolved with a wavelet function. This convolution is performed by superimposing the wavelet function at the beginning of a sample, multiplying the wavelet function with the signal and then integrating the result over the sample period. The result of the integration is scaled and provides the first value for continuous wavelet transform at time equals zero. This point may be then mapped onto a three dimensional plane. The wavelet function is then shifted right and the multiplication and integration steps are repeated to obtain another set of data points which are mapped onto the 3-D space. This process is repeated and the wavelet is moved (convolved) through the entire composite signal. The wavelet is then scaled, which changes the frequency resolution of the transformation, and the above steps are repeated.

Figure 4:
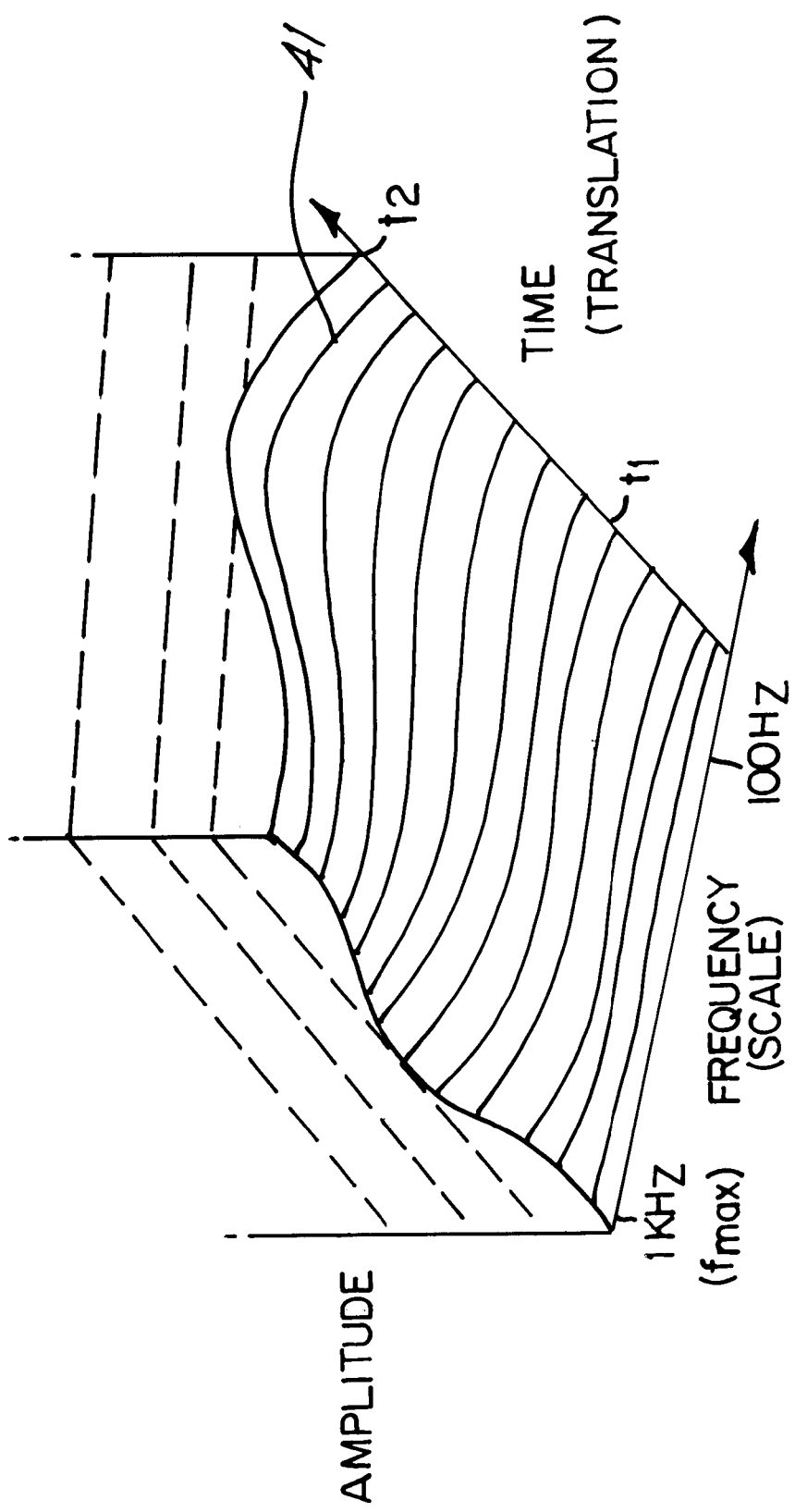
FIG. 4 is a graph showing a nominal base signature for a sensor signal.

Data from a wavelet transformation of a composite sensor signal from sensor 20 is shown in FIG. 4. The data is graphed in three dimensions and forms a surface 41. As shown in the graph of FIG. 4, the composite sensor signal includes a small signal peak at about 1 kHz at time $t_1$ and another peak at about 100 Hz at time $t_2$.

In one aspect of the invention, wavelet transformation data such as that represented in FIG. 4 is calculated and stored in memory 28 shown in FIG. 3 during normal operation of the sensor. This data represents a base "plane" of normal operation. The data may be collected at various times during the day, during a process cycle and during the year. When placed into normal use, life expectancy and diagnostic circuitry 34 retrieves the stored wavelet transformation from memory 28 and compares the base plane data with information gathered through wavelet analysis during operation. For example, if circuitry 34 subtracts the base plane data from a current wavelet transformation, the resultant data represents only the anomalies occurring in the process. Such a subtraction process separates the process variations from the sensor signal along with daily and seasonal variations in the signal. For example, the sensor signal may change during the day or over the course of a year due to environmental temperature changes. Thus, this allows separation of the process signal from the signal due to the sensor.

Figure 5:
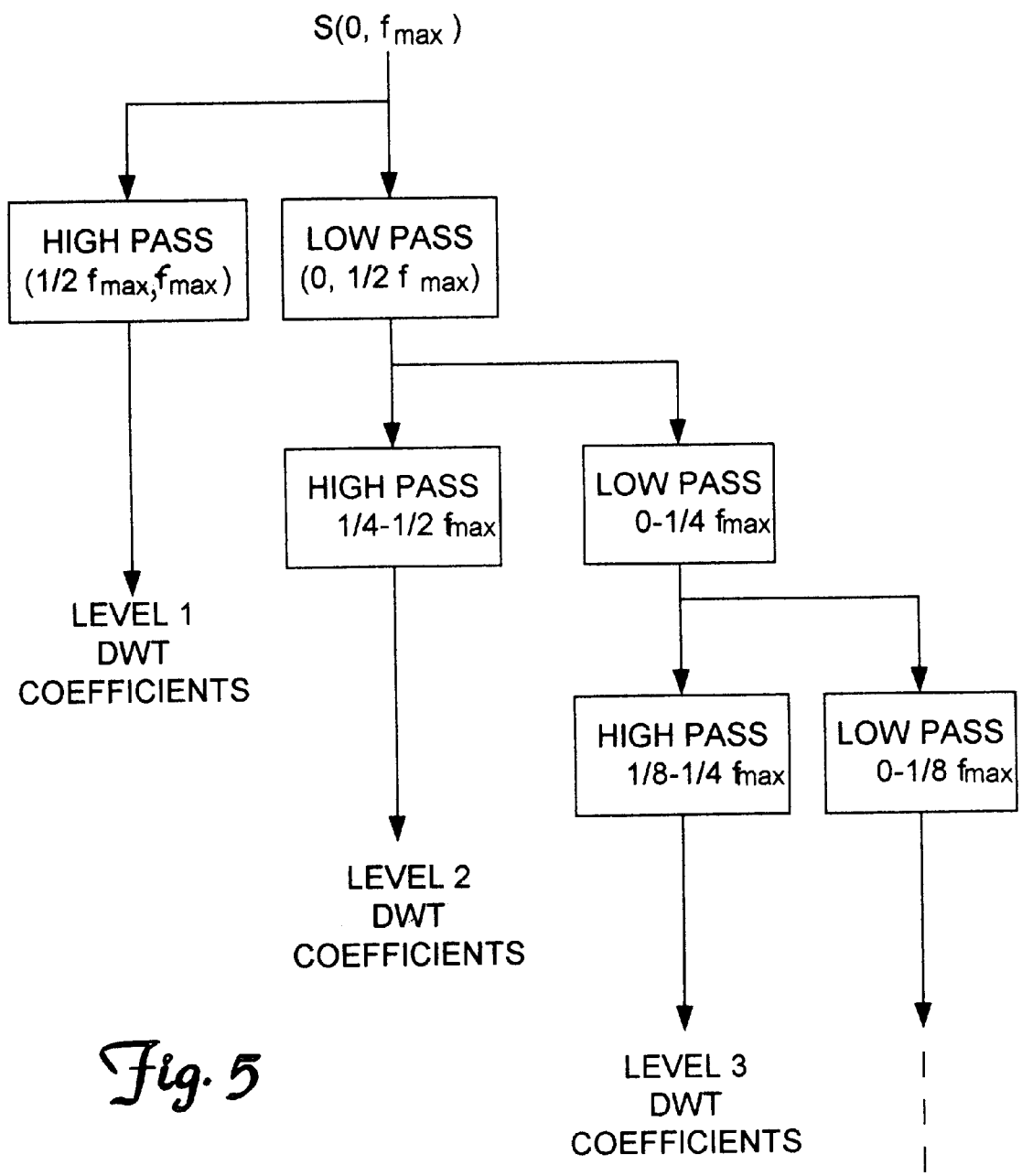
FIG. 5 is a diagram illustrating an individual wavelet transformation.

The continuous wavelet transformation described above requires extensive computations. Therefore, in one preferred embodiment, wavelet processing circuit 32 performs a discrete wavelet transform (DWT) which is well suited for implementation in a microprocessor. One efficient discrete wavelet transform uses the Mallat algorithm which is a two channel sub-band coder. The Mallet algorithm provides a series of separated or decomposed signals which are representative of individual frequency components of the original signal. FIG. 5 shows an example of such a system in which an original sensor signal S is decomposed using a sub-band coder of a Mallet algorithm. The signal S has a frequency range from 0 to a maximum of $f_{MAX}$. The signal is passed simultaneously through a first high pass filter having a frequency range from ½ $f_{MAX}$ to $f_{MAX}$, and a low pass filter having a frequency range from 0 to ½ $f_{MAX}$. This process is called decomposition. The output from the high pass filter provides "level 1" discrete wavelet transform coefficients. The level 1 coefficients represent the amplitude as a function of time of that portion of the input signal which is between ½ $f_{max}$ and $f_{MAX}$. The output from the 0–½ $f_{max}$ low pass filter is passed through subsequent high pass (¼ $f_{max}$–½ $f_{max}$) and low pass (0–¼ $f_{max}$) filters, as desired, to provide additional levels (beyond "level 1") of discrete wavelet transform coefficients. As shown in FIG. 5, the outputs from each low pass filter may be subjected to further decompositions offering additional levels of discrete wavelet transformation coefficients as desired. This process continues until the desired resolution is achieved or until the number of remaining data samples after a decomposition is too small to yield any further information. The resolution of the wavelet transform may be chosen to be approximately the same as the sensor or the same as the minimum signal resolution required to monitor the process. Thus, each level of DWT coefficients is representative of signal amplitude as a function of time for a given frequency range. Coefficients for each frequency range may be concatenated to form a graph such as that shown in FIG. 4.

Figure 6:
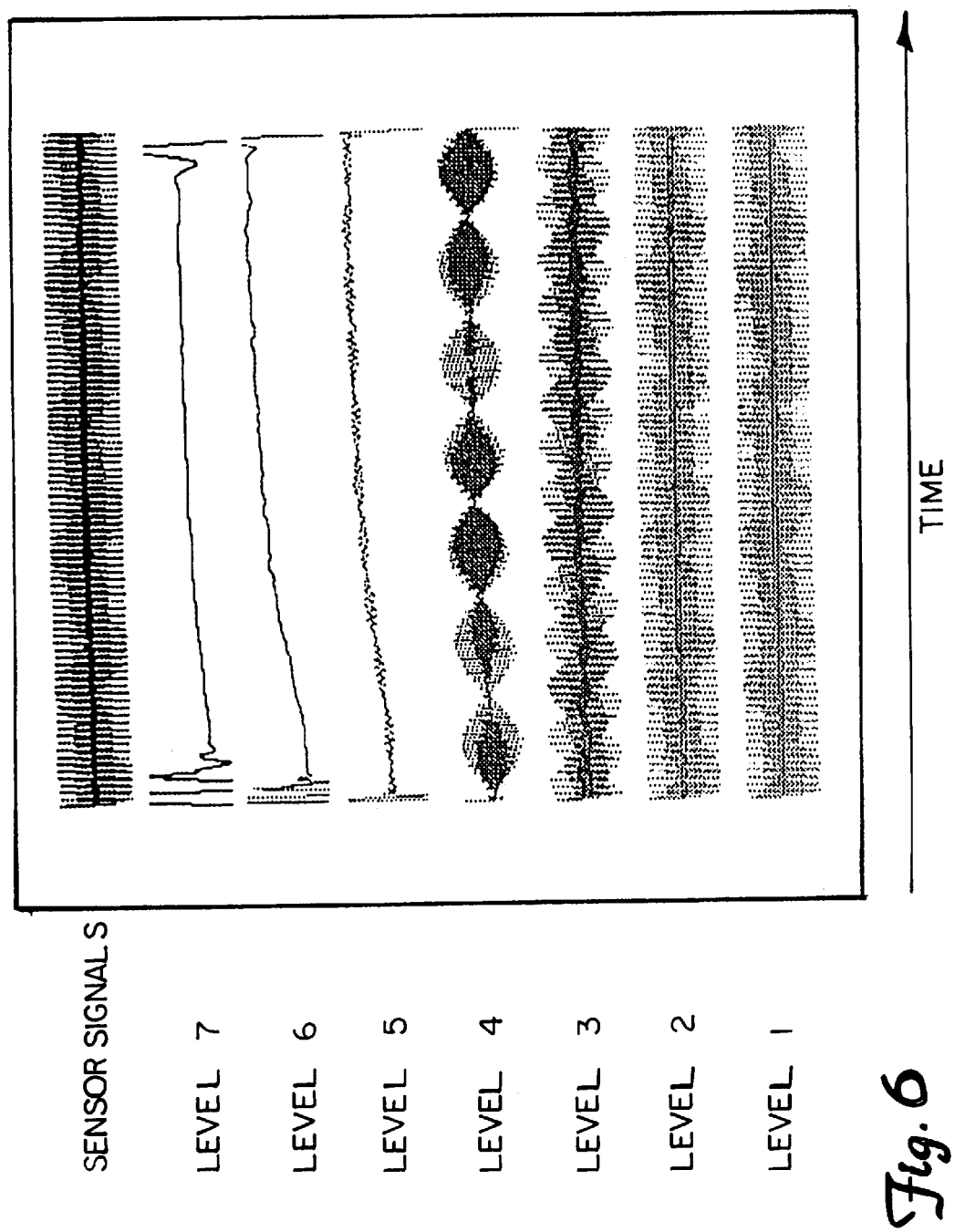
FIG. 6 is a graph illustrating various components of a process variable sensor output from a wavelet decomposition of a composite sensor signal.

FIG. 6 is an example showing a signal S generated by an RTD temperature sensor and the resultant approximation signals yielded in seven levels labelled level 1 through level 7. In this example, signal level 7 is representative of the signal due to the sensor itself and any further decomposition will yield noise. In this particular example, signal due to the sensor is identified as the last signal in the decomposition prior to generating such a noise signal. For example, this can be determined by comparing the differences between successive decompositions and identifying the signal which has the smallest change relative to the next decomposed signal. However, this may vary for different types of sensors or processes.

In some embodiments it may be desirable to add padding to the signal by adding data to the sensor signal near the borders of windows used in the wavelet analysis. This padding reduces distortions in the frequency domain output. This technique may be used with a continuous wavelet transform or a discrete wavelet transform. "Padding" is defined as appending extra data on either side of the current active data window, for example, extra data points are added which extend 25% of the current window beyond either window edge. In one preferred embodiment the extra data is generated by repeating a portion of the data in the current window so that the added data "pads" the existing signal on either side. The entire data set is then fit to a quadratic equation which is used to extrapolate the signal 25% beyond the active data window.

In process control systems where there is a known process variation, for example, due to seasonal changes, the variation can be modeled and thereby removed from the sensor signal to obtain the residual sensor signal. As described above, such modeling may be performed by observing the process or otherwise predicting how the process will change over time. Further, the model may be a function of other process variables or control signals which are used in predicting the process variable signal. In another embodiment of the invention, a number of predetermined models are stored in memory 28. During operation, a neural network operating in microprocessor 26 monitors operation of the process and selects the optimum model stored in memory. Coefficients related to operation of the model may be generated using a neural network or may be received over loop 6 during installation of transmitter 40 as provided for in various communication protocols such as Fieldbus. Examples of models include a first order model including dead time which is typically good for non-oscillatory systems, or second order models plus dead time which typically suffice for oscillatory processes. Another modeling technique is to use an adaptive neural network-fuzzy logic model. Such a hybrid system includes a neural network and fuzzy logic. The fuzzy logic allows adaption of the model to variability of the process while the neural network models allows flexibility of the modeling to thereby adjust to changing processes. This provides a relatively robust model. The use of adaptive membership functions in the fuzzy logic model further allows the determination whether the particular model should be updated.

Further, the novel use of wavelet analysis is well suited for analyzing signals which have transients or other non-stationary characteristics in the time domain. In contrast to Fourier transforms, wavelet analysis retains information in the time domain, i.e., when the signal occurred.

The present invention may operate with any appropriate type of life expectancy or diagnostic circuitry. Examples of such techniques are shown in the co-pending application Ser. No. 08/744,980, filed Nov. 7, 1996, entitled "DIAGNOSTICS FOR RESISTANCE BASED TRANSMITTER," which is incorporated by reference. Further, the invention may be used with any type of process sensor including sensors which measure temperature, pressure, level, flow, pH, turbity, etc.

Although the present invention has been described with reference to preferred embodiments, workers skilled in the art will recognize that changes may be made in form and detail without departing from the spirit and scope of the invention. For example, the sensor may be any type of process variable sensor including temperature, pressure, flow, level, etc.

What is claimed is:

1. A device in a process control system, comprising:
    a sensor input receiving a sensor signal from a process variable sensor, the sensor signal comprising a composite signal which includes a process variable signal and a residual sensor signal related to sensor operation;
    sensor diagnostic circuitry which receives a separated sensor signal and responsively provides an output related to diagnostics of the process variable sensor; and
    wavelet preprocessing circuitry coupled to the sensor signal which separates signal components in the sensor signal and responsively provides the separated sensor signal to the sensor diagnostic circuitry.

2. The device of claim 1 including output circuitry coupled to the sensor input adapted to send an output related to a sensor signal on a two wire process control loop.

3. The device of claim 1 including a process variable sensor providing the sensor signal to the sensor input.

4. The device of claim 1 including a microprocessor implementing the wavelet preprocessing circuitry.

5. The device of claim 1 including a model of a process operation for generating a seasonal variation signal which is subtracted from the sensor signal to thereby identify the residual sensor signal.

6. The device of claim 1 wherein the sensor signal is representative of a process variable selected from the group consisting of temperature, pressure, flow, level, pH, and turbidity.

7. The device of claim 1 wherein the device comprises a transmitter.

8. The device of claim 1 wherein the device comprises a controller.

9. The device of claim 1 including input/output circuitry coupled to a process control loop providing a power output for powering the device, the power output generated completely from power derived from the process control loop.

10. The device of claim 1 wherein the wavelet preprocessing circuitry performs a discrete wavelet transform on the sensor signal.

11. The device of claim 1 wherein wavelet preprocessing circuitry performs a plurality of signal decompositions to obtain the residual sensor signal.

12. The device of claim 1 wherein the wavelet preprocessing circuitry and diagnostic circuitry are implemented in a microprocessor coupled to a process control system.

13. A device in a process control system, comprising:
    a sensor input receiving a sensor signal from a process variable sensor, the sensor signal comprising a composite signal which includes a process variable signal and a residual sensor signal related to sensor operation;
    diagnostic circuitry which receives a separated sensor signal and responsively provides an output related to diagnostics of the process variable sensor; and wavelet preprocessing circuitry coupled to the sensor input which separates signal components in the sensor signal and responsively provides the separated sensor signal to the sensor diagnostic circuitry wherein the wavelet preprocessing circuitry operates over a data window comprising a portion of the sensor signal and signal padding between edges of the data window and the portion of the sensor signal.

14. The device of claim 13 wherein the signal padding is related to the portion of the sensor signal.

15. The device of claim 14 wherein the signal padding is formed by curve fitting to the portion of the sensor signal.

16. The device of claim 15 wherein the curve fit comprises a quadratic equation.

17. The device of claim 1 including a memory storing a representation of signal components from a nominal sensor signal.

18. The device of claim 17 wherein the representation of signal components includes information related to frequency and time of a signal component.

19. The device of claim 1 wherein the wavelet preprocessing circuitry comprises a two channel sub-band coder providing more than one decomposed signal output.

20. The device of claim 1 wherein the two channel sub-band coder comprises a plurality of high pass and low pass filters.

21. A method in a process control for diagnosing operation of a process variable sensor, comprising:

obtaining a sensor signal from a process variable sensor, the sensor signal comprising a composite signal which includes a process variable signal and a residual sensor signal, the residual sensor signal related to sensor operation;

performing a wavelet transformation on the sensor signal and responsively providing a transformed output comprising a plurality of sensor signal components at least one of which includes the residual sensor signal; and diagnosing sensor operation in response to at least one of the plurality of sensor signal components from the wavelet transformation.

22. A method in a process control for diagnosing operation of a process variable sensor, comprising:

obtaining a sensor signal from a process variable sensor, the sensor signal comprising a composite signal which includes a process variable signal and a residual sensor signal, the residual sensor signal related to sensor operation;

performing a wavelet transformation on the sensor signal and responsively providing a transformed output comprising a plurality of sensor signal components at least one of which includes the residual sensor signal; and diagnosing sensor operation in response to at least one of the plurality of sensor signal components from the wavelet transformation wherein the wavelet transformation is performed over a data window, the method further including adding padding to the sensor signal near edges of the data window.

23. The method of claim 21 wherein the step of diagnosing includes comparing the at least one of the plurality of sensor signal components to at least one nominal sensor signal component.

24. The method of claim 23 wherein the step of comparing comprises subtraction.

25. The method of claim 21 wherein the step of performing a wavelet transformation comprises a discrete wavelet transformation.

26. The method of claim 25 wherein the discrete wavelet transformation includes high pass and low pass filtering the sensor signal.

27. The method of claim 21 including subtracting seasonal variations from the at least one of the plurality of sensor signal components.

28. The device of claim 7 wherein the transmitter is coupled to a two wire, 4–20 mA current loop.

* * * * *

UNITED STATES PATENT AND TRADEMARK OFFICE
CERTIFICATE OF CORRECTION

PATENT NO. : 5,956,663
DATED : September 21, 1999
INVENTOR(S) : Evren Eryurek

It is certified that error appears in the above-identified patent and that said Letters Patent is hereby corrected as shown below:

On the title page, item [56],

Under OTHER PUBLICATIONS

Insert --

"Development of a Long-Life, High-Reliability Remotely Operated Johnson Noise Thermometer," by R.L. Shepard et al., ISA, 1991, pgs. 77-84.

"Application of Johnson Noise Thermometry to Space Nuclear Reactors," by M.J. Roberts et al., Presented at the 6th Symposium on Space Nuclear Power Systems, January 9-12, 1989.

"Sensor and Device Diagnostics for Predictive and Proactive Maintenance", by B. Boynton, A Paper Presented at the Electric Power Research Institute - Fossil Plant Maintenance Conference in Baltimore, Maryland, July 29-August 1, 1996, pgs. 50-1 - 50-6.

UNITED STATES PATENT AND TRADEMARK OFFICE
CERTIFICATE OF CORRECTION

PATENT NO. : 5,956,663                                Page 2 of 11
DATED      : September 21, 1999
INVENTOR(S) : Evren Eryurek It is certified that error appears in the above-identified patent and that said Letters Patent is hereby corrected as shown below:

"Smart Field Devices Provide New Process Data, Increase System Flexibility," by Mark Boland, I&CS, November 1994, pgs. 45-51.

"Wavelet Analysis of Vibration, Part I: Theory[1]," by D.E. Newland, Journal of Vibration and Acoustics, Vol. 116, October 1994, pgs. 409-416.

"Wavelet Analysis of Vibration, Part 2: Wavelet Maps," by D.E. Newland, Journal of Vibration and Acoustics, Vol. 116, October 1994, pgs. 417-425.

"Field-based Architecture is Based on Open Systems, Improves Plant Performance", by P. Cleaveland, I&CS, August 1996, pgs. 73-74.

"Tuned-Circuit Dual-Mode Johnson Noise Thermometers," by R.L. Shepard et al., April 1992.

"Tuned-Circuit Johnson Noise Thermometry," by Michael Roberts et al., 7th Symposium on Space Nuclear Power Systems, January 1990.

"Survey, Applications, And Prospects of Johnson Noise Thermometry," by T. Blalock et al., Electrical Engineering Department, 1981 pgs. 2-11.

UNITED STATES PATENT AND TRADEMARK OFFICE
CERTIFICATE OF CORRECTION

PATENT NO. : 5,956,663
DATED : September 21, 1999
INVENTOR(S) : Evren Eryurek

It is certified that error appears in the above-identified patent and that said Letters Patent is hereby corrected as shown below:

"Noise Thermometry for Industrial and Metrological Applications at KFA Julich," by H. Brixy et al., <u>7th International Symposium on Temperature</u>, 1992.

"Johnson Noise Power Thermometer and its Application in Process Temperature Measurement," by T.V. Blalock et al., <u>American Institute of Physics</u> 1982, pgs. 1249-1259.

"In Situ Calibration of Nuclear Plant Platinum Resistance Thermometers Using Johnson Noise Methods," <u>EPRI</u>, June 1983.

"Johnson Noise Thermometer for High Radiation and High-Temperature Environments," by L. Oakes et al., <u>Fifth Symposium on Space Nuclear Power Systems</u>, January 1988, pgs. 2-23.

"Development of a Resistance Thermometer For Use Up to 1600°C", by M.J. de Groot et al., <u>CAL LAB</u>, July/August 1996, pgs. 38-41.

UNITED STATES PATENT AND TRADEMARK OFFICE
CERTIFICATE OF CORRECTION

PATENT NO. : 5,956,663
DATED : September 21, 1999
INVENTOR(S) : Evren Eryurek

It is certified that error appears in the above-identified patent and that said Letters Patent is hereby corrected as shown below:

"Application of Neural Computing Paradigms for Signal Validation," by B.R. Upadhyaya et al., Department of Nuclear Engineering, pgs. 1-18.

"Application of Neural Networks for Sensor Validation and Plant Monitoring," by B. Upadhyaya et al., Nuclear Technology, Vol. 97, No. 2, Feb. 1992 pgs. 170-176.

"Automated Generation of Nonlinear System Characterization for Sensor Failure Detection," by B.R. Upadhyaya et al., ISA, 1989 pgs. 269-274.

"A Decade of Progress in High Temperature Johnson Noise Thermometry," by T.V. Blalock et al., American Institute of Physics, 1982 pgs. 1219-1223.

"Detection of Hot Spots in Thin Metal Films Using an Ultra Sensitive Dual Channel Noise Measurement System," by G.H. Massiha et al., Energy and Information Technologies in the Southeast, Vol. 3 of 3, April 1989, pgs. 1310-1314.

UNITED STATES PATENT AND TRADEMARK OFFICE
CERTIFICATE OF CORRECTION

PATENT NO. : 5,956,663            Page 5 of 11
DATED : September 21, 1999
INVENTOR(S) : Evren Eryurek It is certified that error appears in the above-identified patent and that said Letters Patent is hereby corrected as shown below:

"Detecting Blockage in Process Connections of Differential Pressure Transmitters", by E. Taya et al., SICE, 1995, pgs. 1605-1608.

"Development and Application of Neural Network Algorithms For Process Diagnostics," by B.R. Upadhyaya et al., Proceedings of the 29th Conference on Decision and Control, 1990, pgs. 3277-3282.

"A Fault-Tolerant Interface for Self-Validating Sensors", by M.P. Henry, Colloquium, pgs. 3/1-3/2 (November 1990).

"Fuzzy Logic and Artificial Neural Networks for Nuclear Power Plant Applications," by R.C. Berkan et al., Proceedings of the American Power Conference.

"Fuzzy Logic and Neural Network Applications to Fault Diagnosis", by P. Frank et al., International Journal of Approximate Reasoning, (1997), pgs. 68-88.

UNITED STATES PATENT AND TRADEMARK OFFICE
CERTIFICATE OF CORRECTION

PATENT NO. : 5,956,663
DATED : September 21, 1999
INVENTOR(S) : Evren Eryurek

It is certified that error appears in the above-identified patent and that said Letters Patent is hereby corrected as shown below:

"Keynote Paper: Hardware Compilation-A New Technique for Rapid Prototyping of Digital Systems-Applied to Sensor Validation", by M.P. Henry, Control Eng. Practice, Vol. 3, No. 7., pgs. 907-924, (1995).

"The Implications of Digital Communications on Sensor Validation", by M. Henry et al., Report No. QUEL 1912/92, (1992).

"In-Situ Response Time Testing of Thermocouples", ISA, by H.M. Hashemian et al., Paper No. 89-0056, pgs. 587-593, (1989).

"An Integrated Architecture For Signal Validation in Power Plants," by B.R. Upadhyaya et al., Third IEEE International Symposium on Intelligent Control, August 24-26, 1988, pgs. 1-6.

"Integration of Multiple Signal Validation Modules for Sensor Monitoring," by B. Upadhyaya et al., Department of Nuclear Engineering, July 8, 1990, pgs. 1-6.

UNITED STATES PATENT AND TRADEMARK OFFICE
CERTIFICATE OF CORRECTION

PATENT NO. : 5,956,663
DATED : September 21, 1999
INVENTOR(S) : Evren Eryurek

It is certified that error appears in the above-identified patent and that said Letters Patent is hereby corrected as shown below:

"Intelligent Behaviour for Self-Validating Sensors", by M.P. Henry, *Advances In Measurement*, pgs. 1-7, (May 1990).

"Measurement of the Temperature Fluctuation in a Resistor Generating 1/F Fluctuation," by S. Hashiguchi, *Japanese Journal of Applied Physics*, Vol. 22, No. 5, Part 2, May 1983, pgs. L284-L286.

"Check of Semiconductor Thermal Resistance Elements by the Method of Noise Thermometry", by A. B. Kisilevskii et al., *Measurement Techniques*, Vol. 25, No. 3, March 1982, New York, USA, pgs. 244-246.

"Neural Networks for Sensor Validation and Plant Monitoring," by B. Upadhyaya, *International Fast Reactor Safety Meeting*, August 12-16, 1990, pgs. 2-10.

"Neural Networks for Sensor Validation and Plantwide Monitoring," by E. Eryurek, 1992.

UNITED STATES PATENT AND TRADEMARK OFFICE
CERTIFICATE OF CORRECTION

PATENT NO. : 5,956,663
DATED : September 21, 1999
INVENTOR(S) : Evren Eryurek

It is certified that error appears in the above-identified patent and that said Letters Patent is hereby corrected as shown below:

"A New Method of Johnson Noise Thermometry", by C.J. Borkowski et al., Rev. Sci. Instrum., Vol. 45, No. 2,. (February 1974) pgs. 151-162.

"Parallel, Fault-Tolerant Control and Diagnostics System for Feedwater Regulation in PWRS, by E. Eryurek et al., Proceedings of the American Power Conference.

"Programmable Hardware Architectures for Sensor Validation", by M.P. Henry et al., Control Eng. Practice, Vol. 4, No. 10., pgs. 1339-1354, (1996).

UNITED STATES PATENT AND TRADEMARK OFFICE
CERTIFICATE OF CORRECTION

PATENT NO. : 5,956,663
DATED : September 21, 1999
INVENTOR(S) : Evren Eryurek

It is certified that error appears in the above-identified patent and that said Letters Patent is hereby corrected as shown below:

"Sensor Validation for Power Plants Using Adaptive Backpropagation Neural Network," *IEEE Transactions on Nuclear Science*, Vol. 37, No. 2, by E. Eryurek et al. April 1990, pgs. 1040-1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., *C&I*, (1990).

"On-Line Tool Condition Monitoring System with Wavelet Fuzzy Neural Network," by L. Xiaoli et al., *JOURNAL OF INTELLIGENT MANUFACTURING*, 1997, pgs. 271-276. --

UNITED STATES PATENT AND TRADEMARK OFFICE
CERTIFICATE OF CORRECTION

PATENT NO. : 5,956,663
DATED : September 21, 1999
INVENTOR(S) : Evren Eryurek

It is certified that error appears in the above-identified patent and that said Letters Patent is hereby corrected as shown below:

"Software-Based Fault-Tolerant Control Design for Improved Power Plant Operation," *IEEE/IFAC Joint Symposium on Computer-Aided Control System Design*, March 7-9, 1994 pgs. 585-590.

"A Standard Interface for Self-Validating Sensors, by M.P. Henry et al., *Report No. QUEL 1884/91*, (1991).

"Taking Full Advantage of Smart Transmitter Technology Now," by G. Orrison, *Control Engineering*, Vol. 42, No. 1, January 1995.

"Using Artificial Neural Networks to Identify Nuclear Power Plant States," by Israel E. Alguindigue et al., pgs. 1-4.

UNITED STATES PATENT AND TRADEMARK OFFICE
CERTIFICATE OF CORRECTION

PATENT NO.   : 5,956,663
DATED        : September 21, 1999
INVENTOR(S)  : Evren Eryurek It is certified that error appears in the above-identified patent and that said Letters Patent is hereby corrected as shown below:

"On-Line Statistical Process Control for a Glass Tank Ingredient Scale," by R.A. Weisman, IFAC real Time Programming, 1985, pgs. 29-38.

"The Performance of Control Charts for Monitoring Process Variation," by C. Lowry et al., COMMUN. STATIS. - SIMULA., 1995, pgs. 409-437.

"A Knowledge-Based Approach for Detection and Diagnosis of Out-Of-Control Events in Manufacturing Processes," by P. Love et al., IEEE, 1989, pgs. 736-741.

Signed and Sealed this

Twenty-eighth Day of November, 2000

Attest:

Q. TODD DICKINSON

Attesting Officer

Director of Patents and Trademarks